United States Patent
John et al.

(10) Patent No.: US 11,469,691 B2
(45) Date of Patent: Oct. 11, 2022

(54) UNMANNED AIRCRAFT, INFORMATION PROCESSING METHOD, AND RECORDING MEDIUM

(71) Applicant: Panasonic Intellectual Property Management Co., Ltd., Osaka (JP)

(72) Inventors: Stephen William John, Nara (JP); Kazunobu Konishi, Osaka (JP); Katsuhiko Asai, Nara (JP); Kazuo Inoue, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 312 days.

(21) Appl. No.: 16/520,797

(22) Filed: Jul. 24, 2019

(65) Prior Publication Data
US 2020/0036305 A1    Jan. 30, 2020

(30) Foreign Application Priority Data

Jul. 26, 2018  (JP) .............................. JP2018-139975

(51) Int. Cl.
*B64C 39/00* (2006.01)
*H02P 5/50* (2016.01)
*B64C 39/02* (2006.01)
*G05D 1/08* (2006.01)
*G05D 1/06* (2006.01)

(52) U.S. Cl.
CPC .............. *H02P 5/50* (2013.01); *B64C 39/024* (2013.01); *G05D 1/0607* (2013.01); *G05D 1/0816* (2013.01); *B64C 2201/027* (2013.01); *B64C 2201/123* (2013.01); *B64C 2201/141* (2013.01); *B64C 2201/162* (2013.01)

(58) Field of Classification Search
CPC combination set(s) only.
See application file for complete search history.

(56) References Cited

U.S. PATENT DOCUMENTS

| 4,795,111 | A | 1/1989 | Moller |
| 9,422,055 | B1* | 8/2016 | Beckman .............. B64C 39/024 |
| 10,370,093 | B1* | 8/2019 | Beckman ............... G08G 5/025 |
| 2006/0049304 | A1 | 3/2006 | Sanders, Jr. et al. |
| 2012/0234968 | A1* | 9/2012 | Smith .................... B64D 17/64 244/12.3 |

(Continued)

FOREIGN PATENT DOCUMENTS

| JP | 56-13293 | 2/1981 |
| JP | 2017-502568 | 1/2017 |

(Continued)

*Primary Examiner* — James M McPherson
(74) *Attorney, Agent, or Firm* — Wenderoth, Lind & Ponack, L.L.P.

(57) ABSTRACT

An unmanned aircraft includes: a processor; and at least two generators that generate thrust for the unmanned aircraft to fly, the at least two generators each including a corresponding one of rotor blades that produce airflows. In the unmanned aircraft, the processor generates a control request for changing a rotational speed of at least one of the rotor blades of the at least two generators to reduce a difference between rotational speeds, in response to start of sound recording by a microphone, and the at least two generators rotate the rotor blades in accordance with the control request.

9 Claims, 8 Drawing Sheets

(56) References Cited

U.S. PATENT DOCUMENTS

| | | | |
|---|---|---|---|
| 2016/0063987 A1 | 3/2016 | Xu et al. | |
| 2016/0083073 A1* | 3/2016 | Beckman | |
| 2017/0238505 A1* | 8/2017 | Gordon | A01K 29/00 |
| 2019/0291856 A1* | 9/2019 | Kaufman | B64C 27/473 |

FOREIGN PATENT DOCUMENTS

| | | |
|---|---|---|
| JP | 2017-534900 | 11/2017 |
| WO | 2016/029469 | 3/2016 |

* cited by examiner

UNMANNED AIRCRAFT, INFORMATION PROCESSING METHOD, AND RECORDING MEDIUM

CROSS REFERENCE TO RELATED APPLICATION

This application claims the benefit of priority of Japanese Patent Application Number 2018-139975 filed on Jul. 26, 2018, the entire content of which is hereby incorporated by reference.

BACKGROUND

1. Technical Field

The present disclosure relates to an unmanned aircraft, an information processing method, and a recording medium.

2. Description of the Related Art

Japanese Unexamined Patent Application Publication No. 2017-502568 (Patent Literature 1: PTL 1) discloses an unmanned aerial vehicle that performs a process of removing background noise generated by the unmanned aerial vehicle from sound data picked up by a microphone in order to isolate a desired sound signal.

SUMMARY

When the background noise is louder than the other sounds, the technology disclosed in PTL 1 may reduce the resulting quality of the desired sounds obtained by the process of removing the background noise.

In view of the above, the present disclosure aims to provide an unmanned aircraft, an information processing method, and a recording medium that are capable of enhancing the quality of the target sound.

The unmanned aircraft according to one aspect of the present disclosure is an unmanned aircraft, including: a processor; and at least two generators that generate thrust for the unmanned aircraft to fly, the at least two generators each including a corresponding one of rotor blades that produce airflows. In such unmanned aircraft, the processor generates a control request for changing a rotational speed of at least one of the rotor blades of the at least two generators to reduce a difference between rotational speeds, in response to start of sound recording by a microphone, and the at least two generators rotate the rotor blades in accordance with the control request. The control request may be a rotational speed instruction generated by the processor for the generators, and may incorporate a correction factor to correct for variations in the actual rotation speed of the generator.

The information processing method according to another aspect of the present disclosure is an information processing method performed by an information processing device that communicates with an unmanned aircraft, the unmanned aircraft including a processor, and at least two generators that generate thrust for the unmanned aircraft to fly, the at least two generators each including a corresponding one of rotor blades that produce airflows. Such information processing method includes: generating a control request for changing a rotational speed of at least one of the rotor blades of the at least two generators to reduce a difference between rotational speeds, in response to start of sound recording by a microphone; and transmitting the control request generated in the generating to the unmanned aircraft.

Note that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The unmanned aircraft, the information processing method, and the recording medium according to the present disclosure allow high quality sound to be recorded by the unmanned aircraft.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
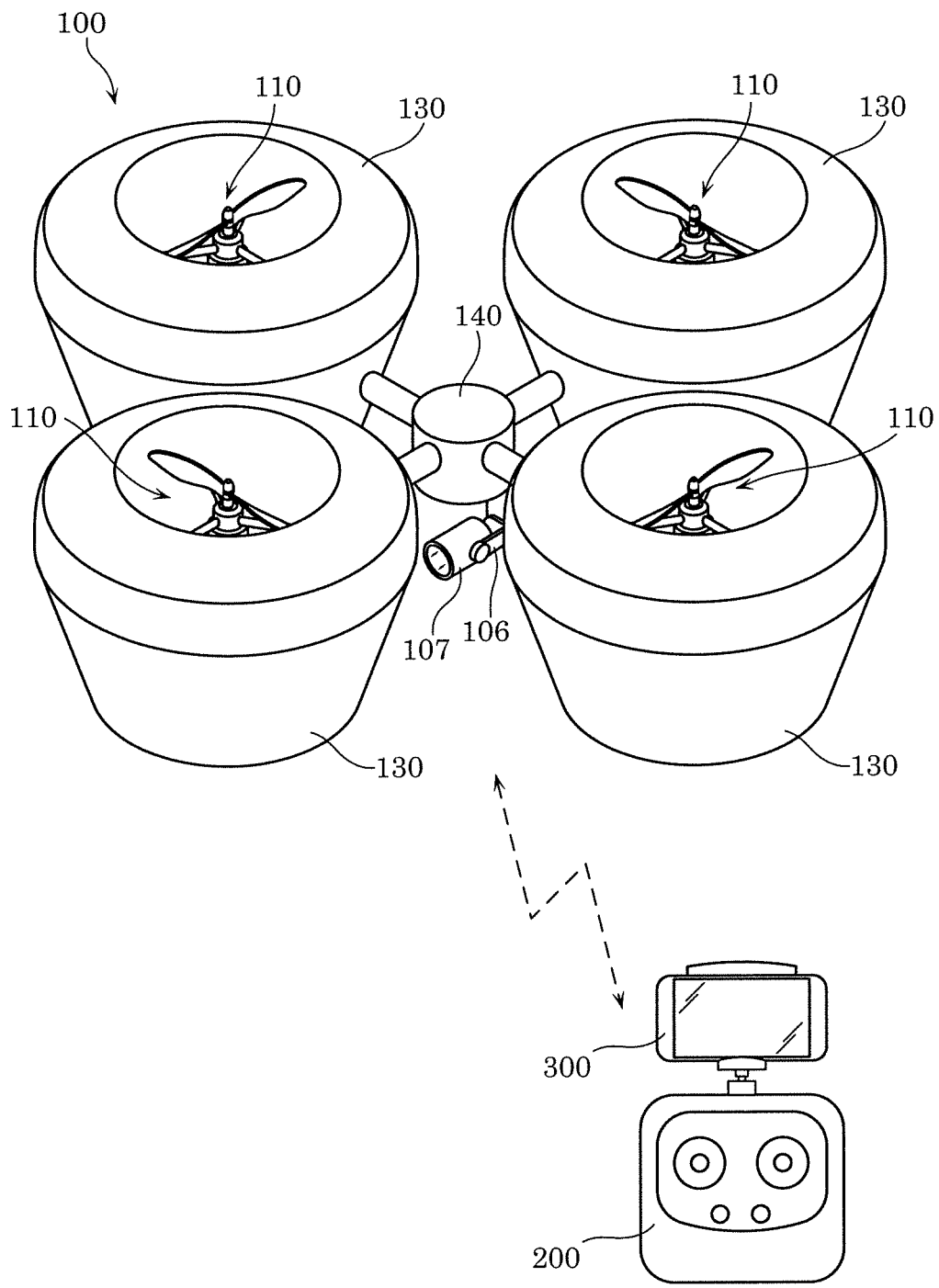
FIG. 1 shows external views of an unmanned aircraft and a controller according to an embodiment of the present disclosure.

Findings that Forms Basis of the Present Disclosure

An unmanned aerial vehicle as disclosed in PTL 1 includes one or more propulsion units each having a rotor blade, and individually adjusts the rotational speed of the rotor blade of each of the propulsion units to maintain the in-flight altitude, speed, or attitude. As the propeller rotates through the air, a sudden pressure change is generated by each propeller blade, generating sound. The frequency of this sound is proportional to the number of blades of the rotor and the speed of rotation. Stated differently, since the rotational speeds of the rotor blades of the respective propulsion units are different from one another, the noise generated by the combined propulsion units are distributed over a wide frequency range. For this reason, when the noises caused by the propulsion units are removed by filtering, the sound components in a wide frequency range are also removed from the obtained sound data. The sound components of the target sound are thus removed together, making it difficult to obtain high-quality sound data.

In order to solve the above concerns, the unmanned aircraft according to one aspect of the present disclosure is an unmanned aircraft, including: a processor; and at least two generators that generate thrust for the unmanned aircraft to fly, the at least two generators each including a corresponding one of rotor blades that produce airflows. In such unmanned aircraft, the processor generates a control request for changing a rotational speed of at least one of the rotor blades of the at least two generators to reduce a difference between rotational speeds, in response to start of sound recording by a microphone, and the at least two generators rotate the rotor blades in accordance with the control request.

This configuration changes the rotational speed of at least one of the rotor blades included in the at least two generators to reduce the difference in the rotational speeds, when the microphone starts sound recording. This configuration is thus capable of narrowing the frequency range of the noises caused by the at least two generators. As a result, the self-generated unmanned aircraft noise component of the recorded sound is limited to a narrow frequency range, so the frequency range of the original sound influenced by filtering is minimized. The quality of the target sound is thus enhanced.

The unmanned aircraft may further include the microphone that generates sound data.

This configuration facilitates the synchronization between the start of sound recording by the microphone and the control of the rotor blades.

The processor may further filter, from the sound data generated by the microphone, a portion corresponding to a frequency range of noise caused by rotation of each of the rotor blades.

This configuration can filter the sound signal with minimal delay, as compared to using an external device, allowing faster response of the unmanned aircraft in response to a sound.

The processor may generate the control request for changing the rotational speed of at least one of the rotor blades to be identical to at least another one of the rotor blades.

This configuration narrows to minimize the frequency range of the noises caused by the rotations of the rotor blades included in the at least two generators, and thus effectively reduces such noises.

The processor may determine a rotational speed, to which the rotational speed of at least one of the rotor blades is changed in response to the control request, for maintaining an altitude, speed, attitude, or other state of the unmanned aircraft in flight.

This configuration maintains the altitude, speed, attitude, or other state of the unmanned aircraft in flight even when the rotational speed of at least one of the rotor blades included in the at least two generators is changed to reduce the difference in the rotational speeds. This thus enables the target sound to be recorded in a trackable manner.

The unmanned aircraft may further include: a regulator that regulates a direction of each of the airflows produced by the at least two generators; and an attitude sensor that detects an attitude of the aircraft. In such unmanned aircraft, the processor may cause the regulator to regulate each of the airflows in a direction in which the attitude of the unmanned aircraft is maintained.

This configuration narrows to minimize the frequency range of the noises caused by the rotations of the rotor blades included in the at least two generators, and also maintains the attitude of the unmanned aircraft.

The regulator may be a deflection plate that is located at a downstream side of the airflows produced by the at least two generators. The deflection plate or plates have an angle controllable by the regulator.

This configuration deflects the airflows produced by the rotor blades of the at least two generators, generating a moment force around the center of gravity of the unmanned aircraft, even when the difference in the rotational speeds of the rotor blades of the at least two generators is small. Adjusting the angle of the deflection plate allows the size of the moment force to be controlled, therefore controlling the rotation of the vehicle around its center of gravity, and thus effectively maintains the attitude of the unmanned aircraft.

The information processing method according to another aspect of the present disclosure is an information processing method performed by an information processing device that communicates with an unmanned aircraft, the unmanned aircraft including a processor, and at least two generators that generate thrust for the unmanned aircraft to fly, the at least two generators each including a corresponding one of rotor blades that produce airflows. Such information processing method includes: generating a control request for changing a rotational speed of at least one of the rotor blades of the at least two generators to reduce a difference between rotational speeds, in response to start of sound recording by a microphone; and transmitting the control request generated in the generating to the unmanned aircraft.

Note that these general or specific aspects may be implemented as a system, a method, an integrated circuit, a computer program, or a computer readable recording medium such as a CD-ROM, or may be implemented as any combination of a system, a method, an integrated circuit, a computer program, and a recording medium.

The following specifically describes the unmanned aircraft according to one aspect of the present disclosure with reference to the drawings.

Note that the following embodiment is a specific example of the present disclosure. The numerical values, shapes, materials, structural components, the arrangement and connection of the structural components, steps, the processing order of the steps, etc. shown in the following embodiment are mere examples, and thus are not intended to limit the present disclosure. Of the structural components described in the following embodiment, structural components not recited in any one of the independent claims that indicate the broadest concepts of the present disclosure will be described as optional structural components.

EMBODIMENT

The following describes the embodiment with reference to FIG. 1 through FIG. 8.

1. Configuration

Figure 2:
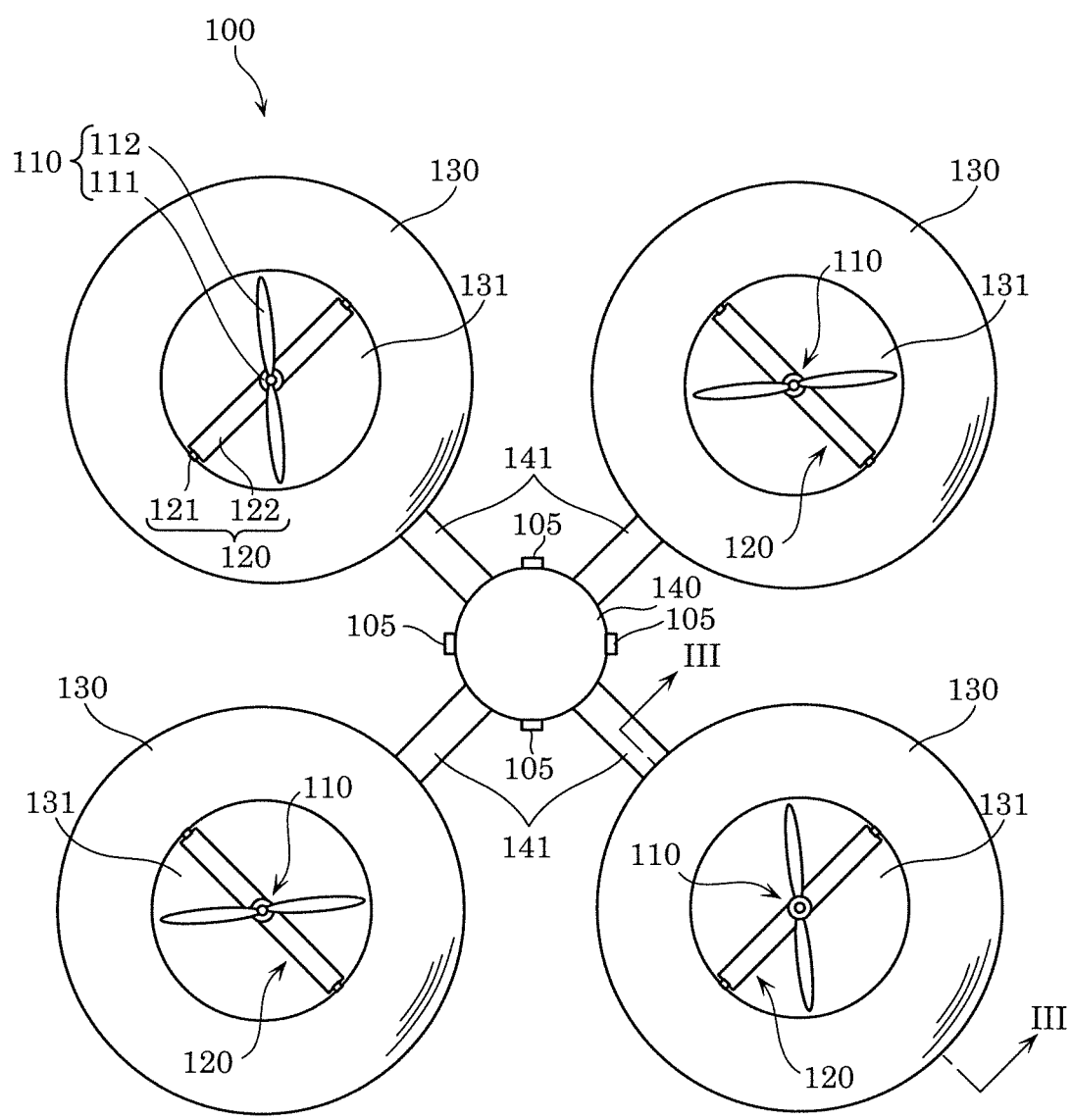
FIG. 2 is a plan view of the unmanned aircraft according to an embodiment of the present disclosure in a top view.

FIG. 1 shows external views of an unmanned aircraft and a controller according to the embodiment. FIG. 2 is a plan view of the unmanned aircraft according to the embodiment in a top view.

As shown in FIG. 1, unmanned aircraft 100 receives from controller 200 an operation signal that is in accordance with a user operation to controller 200, and flies in accordance with the received operation signal. Unmanned aircraft 100 may perform imaging mid-flight by use of camera 107 included in unmanned aircraft 100 in accordance with the received operation signal. The image data captured by camera 107 may be sent to mobile terminal 300 to be described later.

Controller 200 accepts an operation from the user, and sends to unmanned aircraft 100 an operation signal that is in accordance with the accepted operation. Controller 200 may hold mobile terminal 300 such as a smartphone with a display.

Mobile terminal 300 receives from unmanned aircraft 100 the image data captured by camera 107 of unmanned aircraft 100, and displays, for example, the received image data in real time.

This enables the user to operate controller 200 while checking on mobile terminal 300 the image data captured by camera 107 of unmanned aircraft 100 in real time, thereby changing the aircraft state of unmanned aircraft 100 that is at least one of the in-flight position and attitude of unmanned aircraft 100. The user thus can freely change the range of imaging by camera 107 of unmanned aircraft 100.

Unmanned aircraft 100 includes four generators 110, four regulators 120, four ducts 130, main body 140, and four arms 141.

Each of four generators 110 generates thrust to fly unmanned aircraft 100. More specifically, each of four generators 110 produces an airflow to generate thrust to fly unmanned aircraft 100. Each of four generators 110 includes rotor blade 111 that rotates to produce an airflow, and actuator 112 that rotates rotor blade 111. Each rotor blade 111 and actuator 112 include an axis of rotation that is substantially parallel in the vertical direction to produce an airflow that flows downward from above. This configuration enables four generators 110 to produce thrust that levitates unmanned aircraft 100 upward, allowing unmanned aircraft 100 to fly. Each actuator 112 is, for example, a motor.

In a top view, four generators 110 are arranged around main body 140 at 90 degree intervals. Stated differently, four generators 110 are arranged in a circular form to surround main body 140.

Note that rotor blade 111 included in each of four generators 110 is illustrated to be formed by a single propeller as a non-limited example, and thus rotor blade 111 may be formed by a counter-rotating propeller that includes two propellers that rotate in counter directions about the same axis of rotation. The propeller may also have more than two blades.

Figure 3A:
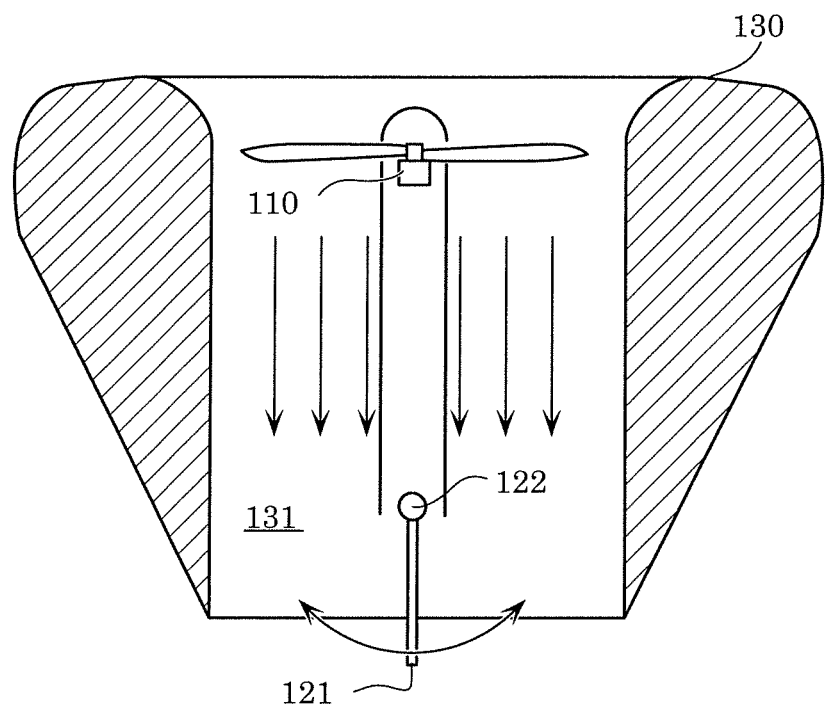
FIG. 3A is an exemplary cross-sectional view of the unmanned aircraft taken at line in FIG. 2.
Figure 3B:
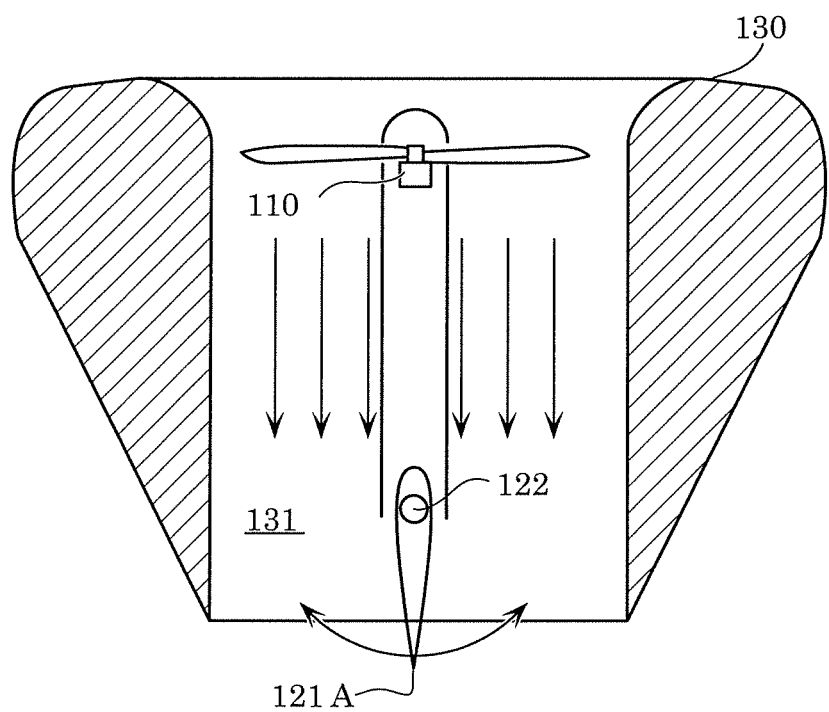
FIG. 3B is another exemplary cross-sectional view of the unmanned aircraft taken at line in FIG. 2.

FIG. 3A is an exemplary cross-sectional view of the unmanned aircraft taken at line in FIG. 2. FIG. 3B is another exemplary cross sectional view of the unmanned aircraft taken at line in FIG. 2. Stated differently, FIG. 3A and FIG. 3B are cross sectional views of a single generator 110 and its corresponding duct 130 cut along a plane that runs through the axis of rotation of rotor blade 111.

One duct 130 is provided to each generator 110, with the axis of rotation of the generator substantially parallel and in-line with the axis of duct 130 internal open volume. Each of four ducts 130 is arranged to laterally cover the corresponding generator 110. Stated differently, each of four ducts 130 is arranged to cover the corresponding generator 110 in a direction that is substantially orthogonal to the direction of the axis of rotation of rotor blade 111 of the corresponding generator 110. For example, each of four ducts 130 laterally covers the corresponding generator 110 along the length in the direction of the axis of rotation of such generator 110. Stated differently, each of four ducts 130 has space 131 in which the corresponding generator 110 is arranged, and which has the shape of a circular cylinder that vertically passes through duct 130. Each of four ducts 130 has a shape that tapers in thickness toward the downstream side of an airflow produced by the corresponding generator 110. More specifically, each of four ducts 130 has a shape in which the outer surface of duct 130 is nearer to the inner surface of such duct 130 in a circular cylindrical shape toward the downstream side of an airflow produced by the corresponding generator 110. Stated differently, each of four ducts 130 has a pointed shape at its downstream side of an airflow produced by the corresponding generator 110. Also, the inner surface of each duct 130 has a rounded end portion at its upstream side of an airflow. More specifically, such end portion has a shape in which the inner diameter of duct 130 tapers in the flow direction of an airflow. This shape facilitates the flow of the air into duct 130, and thus improves the flight performance. This also achieves the weight reduction of ducts 130, and further the lightening of unmanned aircraft 100. Note that such end portion may have a linear shape that extends along the flow direction of an airflow.

Four regulators 120, which are arranged in correspondence with the respective four generators 110, regulate the directions of the airflows produced by four generators 110. As shown in FIG. 3A, each of four regulators 120 includes deflection plate 121 that is located at the downstream side of an airflow produced by the corresponding generator 110, and actuator 122 that changes the angle of deflection plate 121. As shown in FIG. 2, deflection plate 121 is arranged, for example, in an orientation in which the axis of rotation of deflection plate 121 intersects with, e.g., substantially orthogonal to, the direction along which the center of main body 140 and generator 110 are arranged. This configuration enables each of four regulators 120 to orient the angle of an airflow produced by the corresponding generator 110 closer toward main body 140, or away from main body 140, generating a moment around the center of mass of the unmanned aircraft. The deflection plate may be located substantially orthogonal to the center of mass of the unmanned aircraft, allowing stabilized moments to be generated in one axis of rotation, simplifying control. Note that an example of actuator 122 is a motor. Also note that the orientation of deflection plate 121 may be controlled in the normal control so as not to generate a moment. For example, deflection plate 121 may be fixed to face the vertical direction, i.e., the flow direction of an airflow, or may be oriented and fixed in accordance with the attitude of duct 130 or unmanned aircraft 100.

The shape of deflection plate 121 may be a plate-like shape as shown in FIG. 3A. Alternatively, deflection plate 121A having a wing-like shape as shown in FIG. 3B may be employed instead of deflection plate 121. Deflection plate 121A having a wing-like shape that is more aerodynamic, allowing larger angles before the occurrence of flow separation and loss of effect, compared to deflection plate 121 having a plate-like shape.

An example of main body 140 is a boxy member in a circular cylindrical shape, i.e., a cabinet. Electrical components such as a processor, a memory, a battery, and various sensors are arranged inside main body 140. Note that the shape of the member of main body 140 is not limited to a circular cylindrical shape, and thus may be another boxy shape such as a quadrangular prism. Main body 140 also includes four microphones 105, gimbal 106, and camera 107 on the outer surface. Each of four microphones 105 is arranged, for example, at a position on main body 140 in between two adjacent generators 110 of four generators 110. Stated differently, four microphones 105 are arranged about main body 140 at positions that are 45 degrees off from each other with respect to the direction that faces four generators 110.

Four arms 141 are members that connect the respective four ducts 130 with main body 140. Each of four arms 141 has one end fixed to main body 140, and the other end fixed to the corresponding one of four ducts 130.

Figure 4:
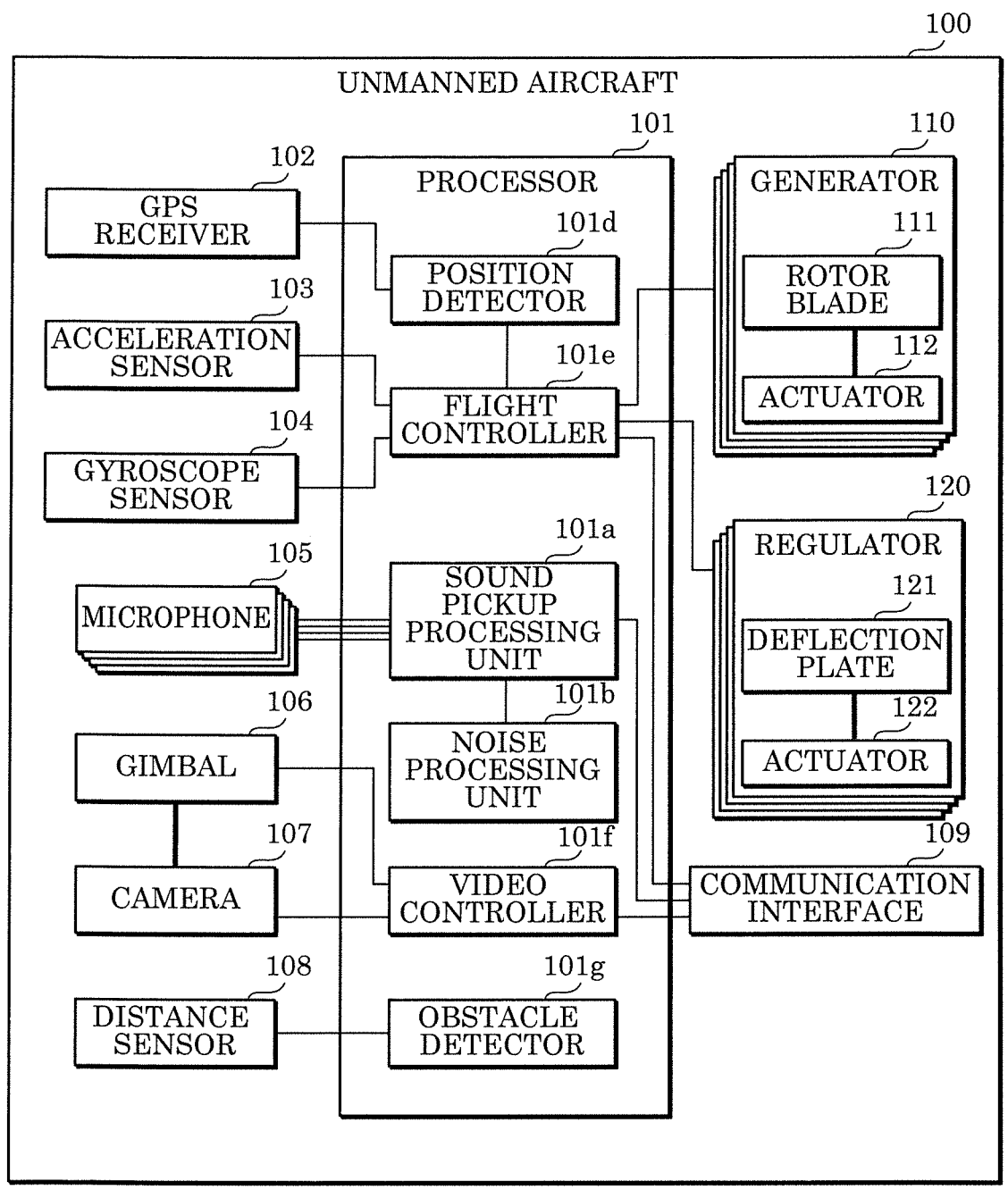
FIG. 4 is a block diagram of the configuration of the unmanned aircraft according to an embodiment of the present disclosure.

FIG. 4 is a block diagram of the configuration of the unmanned aircraft according to the embodiment. More specifically, FIG. 4 is a block diagram that illustrates the function of processor 101 that is implemented by use of the hardware configuration of unmanned aircraft 100.

As shown in FIG. 4, unmanned aircraft 100 includes processor 101, global positioning system (GPS) receiver 102, acceleration sensor 103, gyroscope sensor 104, four microphones 105, gimbal 106, camera 107, distance sensor 108, communication IF 109, and four generators 110.

Processor 101 obtains results such as: detection results from various sensors such as acceleration sensor 103, gyroscope sensor 104, four microphones 105, an image sensor of camera 107, and distance sensor 108; a reception result from GPS receiver 102 or communication IF 109; and others. Processor 101 executes various processes on the obtained detection results or the reception result by executing a predetermined program stored in a non-illustrated memory or storage, thereby controlling at least one of: four generators 110; gimbal 106; and camera 107.

GPS receiver 102 receives information indicating the position of GPS receiver 102 from satellites including a GPS satellite. Stated differently, GPS receiver 102 detects the current position of unmanned aircraft 100.

Acceleration sensor 103 is a sensor that detects accelerations in three different directions of unmanned aircraft 100. Acceleration sensor 103 is an example of the attitude sensor that detects the attitude of unmanned aircraft 100.

Gyroscope sensor 104 is a sensor that detects an angular rate of rotation about each of the three axes in the three different directions of unmanned aircraft 100. Gyroscope sensor 104 is an example of the attitude sensor that detects the attitude of unmanned aircraft 100.

Each of four microphones 105 is a microphone, and an example of the sensors. Each of four microphones 105 has directionality that enables the pickup of sounds, in a sound pickup area of microphone 105, having higher sound quality than the quality of sounds in an angular range other than such sound pickup area. Here, the sound pickup area is a predetermined angular range that is defined with respect to a specified direction. The predetermined angular range is, for example, an angular range of 90 degrees or less, and a three-dimensional angular range that expands with respect to the position of each microphone 105. Each of four microphones 105 may be a microphone array having a plurality of microphone elements. Each of four microphones 105 picks up sound to generate sound data, and outputs the generated sound data.

Gimbal 106 is a device for maintaining a constant attitude of camera 107 in the three-axis directions. Stated differently, gimbal 106 is a device for maintaining a desired attitude of camera 107 relative to the terrestrial coordinate system, for example, even when the attitude of unmanned aircraft 100 changes. Here, the desired attitude is an attitude that is defined by an imaging direction of camera 107 indicated by an operation signal received from controller 200.

Camera 107, which is an example of the sensors, is a device having an image sensor, and an optical system such as a lens.

Distance sensor 108 is a sensor that detects the distance from distance sensor 108 to an object around. Examples of distance sensor 108 include an ultrasonic sensor, a time of flight (TOF) camera, and a light detection and ranging (LIDAR).

Communication IF 109 is intended for communication with controller 200 or mobile terminal 300. Communication IF 109 includes, for example, a communication interface for receiving a transmission signal from controller 200. Communication IF 109 may also be a communication interface for wireless communication with mobile terminal 300. Stated differently, communication IF 109 may be a wireless local area network (LAN) interface compliant with, for example, the IEEE 802.11a,b,g,n, and ac standards.

Four generators 110 and four regulators 120 have been described above, and thus will not be described here.

Functional components included in processor 101 are sound pickup processing unit 101a, noise processing unit 101b, sound source identifier 101c, position detector 101d, flight controller 101e, video controller 101f, and obstacle detector 101g.

Sound pickup processing unit 101a obtains the sound data generated by each of four microphones 105 by picking up sounds.

Noise processing unit 101b performs, on the pieces of sound data obtained by sound pickup processing unit 101a from four microphones 105, a predetermined sound process of filtering sound components in predetermined frequency ranges, thereby reducing the noises included in the pieces of sound data. The sound components in the predetermined frequency ranges are, for example, sound components in the frequency ranges of the noises caused by the rotations of rotor blades 111 of generators 110. The frequency of the noise generated by the rotations of the rotor blades may be determined from the control signal generated by the flight controller, by measurement of the rotation of the blades, or background noise generated by the unmanned aircraft. In the case where rotational speed is used, the base frequency of the noise is the rotation speed of the motor multiplied by the number of rotor blades.

Position detector 101d obtains the detection result from GPS receiver 102 to detect the current position of unmanned aircraft 100. The GPS receiver 102 may optionally include a compass sensor.

Flight controller 101e controls the rotational speed of actuator 112 of each generator 110, thereby controlling the unmanned aircraft 100 state in accordance with: the current position of unmanned aircraft 100 detected by position detector 101d; the flight speed and flight attitude of unmanned aircraft 100 obtained from the detection results of acceleration sensor 103 and gyroscope sensor 104; and the operation signal from controller 200 received by communication IF 109. Stated differently, flight controller 101e performs normal control of controlling the aircraft state of unmanned aircraft 100 in accordance with a user operation to controller 200.

When four microphones 105 start sound recording, flight controller 101e switches from the normal control in which unmanned aircraft 100 is in normal flight to the sound recording control in which unmanned aircraft 100 flies, with the rotational speeds of rotor blades 111 of four generators 110 having a reduced difference. When four microphones 105 finish the sound recording, flight controller 101e switches from the sound recording control to the normal control. Stated differently, flight controller 101e generates a control request for changing the rotational speed of at least one of rotor blades 111 of four generators 110 to reduce the difference in the rotational speeds, in response to the start of sound recording by four microphones 105. Flight controller 101e then outputs the generated control request to four generators 110. Through this process, in the sound recording control, at least one of four generators 110 changes the rotational speed of the corresponding rotor blade 111 to reduce the difference in the rotational speeds of rotor blades 111 in accordance with the control request.

More specifically, the control request generated by flight controller 101e is a control request for changing the rotational speed of at least one rotor blade 111 of four generators 110 to be an identical rotational speed of at least one other rotor blade 111. Flight controller 101e determines a rotational speed, to which the rotational speed of at least one of rotor blades 111 is changed in response to the control request generated in the sound recording control, for maintaining the altitude, speed, attitude, or other state of unmanned aircraft 100 in flight. Stated differently, in the sound recording control, flight controller 101e determines the rotational speed that is greater than a predetermined rotational speed for maintaining the altitude, speed, attitude, or other state of unmanned aircraft 100 in flight, as the rotational speed of at least one of rotor blades 111 to be changed in response to the control request. When altitude is controlled, for example, flight controller 101e determines the rotational speed to minimize the desired altitude and altitude change estimated by the acceleration sensor, gyroscope sensor, or other altitude sensor. Examples of the altitude sensor include a GPS sensor, a distance sensor, and a barometer. When controlling the altitude and there is an instruction from controller 200, flight controller 101e modifies the desired altitude, and determines the rotational speed to minimize error between the desired altitude and estimated altitude. Note that flight controller 101e may determine a rotational speed, to which the rotational speed of at least one of rotor blades 111 is changed in response to the control request, for maintaining the altitude of unmanned aircraft 100 in accordance with the weight of unmanned aircraft 100.

Also note that the rotational speed is not required to be an exactly identical number, and thus the rotational speed that can be regarded as in the same range of numbers may be determined.

Flight controller 101e also causes four regulators 120 to regulate the airflows in the direction in which the attitude of unmanned aircraft 100 is maintained. Stated differently, to control the attitude of unmanned aircraft 100 with a reduced difference in the rotational speeds of rotor blades 111 of four generators 110, flight controller 101e controls the angles of deflection plates 121 of four regulators 120 so as to deflect the airflows and subsequently generate a moment around the center of gravity of the aircraft, with the control based on the attitude of unmanned aircraft 100 that is obtained from the detection results from acceleration sensor 103 and gyroscope sensor 104; and a target value of the attitude of unmanned aircraft 100 that is included in the operation signal received from controller 200. This enables the adjustment of moments that depend on the angles of the four airflows, by adjusting the angles of deflection plates 121 of four regulators 120, even in a state in which the difference is reduced in the rotational speed of at least one of rotor blades 111 of four generators 110. This thus enables to control the attitude of unmanned aircraft 100.

The sound recording control may be performed in the case where four microphones 105 pick up the target sound. Stated differently, the sound recording control may be control of picking up only the target sound or may be control of picking up the target sound together with capturing images by camera 107.

Video controller 101f controls gimbal 106 in accordance with the operation signal received by communication IF 109 in order to orient the imaging direction of camera 107 to face the direction indicated by the operation signal, thereby controlling the attitude of camera 107. Video controller 101f may also perform a predetermined image process on the image data captured by camera 107. Video controller 101f may transmit the image data obtained from camera 107 or image data that has undergone the predetermined image process to mobile terminal 300 via communication IF 109.

Obstacle detector 101g detects an obstacle around unmanned aircraft 100 in accordance with the distance, detected by distance sensor 108, from unmanned aircraft 100 to the object. Obstacle detector 101g may exchange information with flight controller 101e, thereby detecting an obstacle located at a destination to which unmanned aircraft 100 is to travel. When detecting an object at the destination to which unmanned aircraft 100 is to travel, obstacle detector 101g may instruct flight controller 101e to cause unmanned aircraft 100 to avoid the obstacle to travel.

2. Operation

The following describes the operation performed by unmanned aircraft 100 according to the embodiment.

Figure 5:
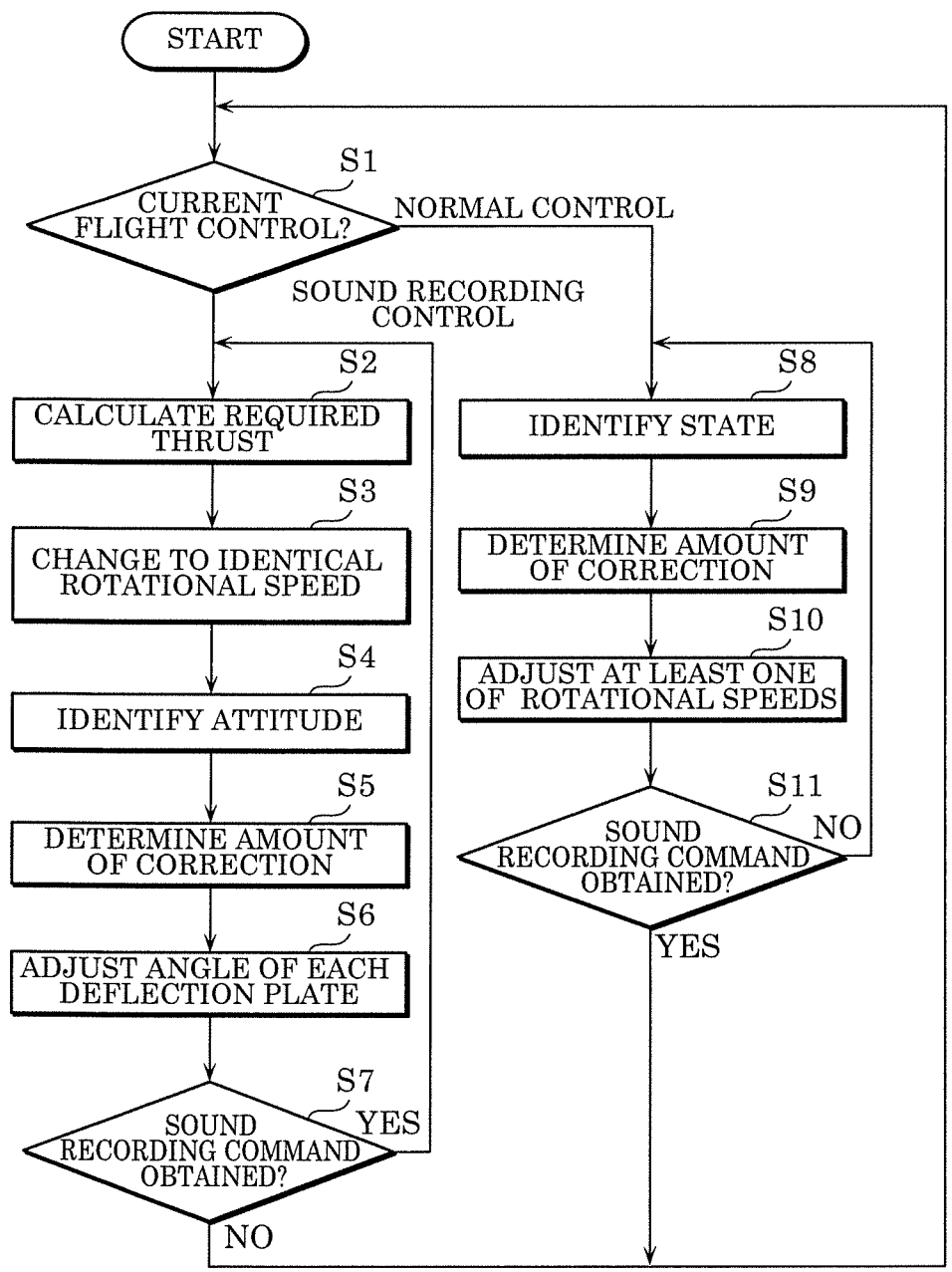
FIG. 5 is a flowchart of an exemplary operation in flight control performed by the unmanned aircraft according to an embodiment of the present disclosure.

FIG. 5 is a flowchart of an exemplary operation in flight control performed by the unmanned aircraft according to the embodiment.

When starting the flight control of unmanned aircraft 100, flight controller 101e of unmanned aircraft 100 determines whether the current flight control is sound recording control or normal control (S1). More specifically, flight controller 101e starts sound recording control when the sound data obtained by sound pickup processing unit 101a includes a sound recording command indicating that sound recording control is to start. Flight controller 101e starts normal control when the sound data obtained by sound pickup processing unit 101a includes a sound recording command indicating that sound recording control is to stop, or a sound recording command indicating that normal control is to start.

When the sound recording control starts, flight controller 101e performs the processes of step S2 through step S7.

Flight controller 101e calculates thrust required by unmanned aircraft 100 to maintain its altitude, speed, and attitude (S2).

Flight controller 101e then changes the rotational speed of at least one rotor blade 111 of four generators 110 to be identical to at least one other rotor blade 111 (S3). In so doing, flight controller 101e changes the rotational speed of at least one rotor blade 111 of four generators 110 to the rotational speed that is required to produce the thrust calculated in step S2.

Next, flight controller 101e identifies the current attitude of unmanned aircraft 100 from the detection results of acceleration sensor 103 and gyroscope sensor 104 (S4).

Flight controller 101e then compares the current attitude of unmanned aircraft 100 that has been identified with the target value of the attitude of unmanned aircraft 100 included in the operation signal received from controller 200 to determine an amount of correction required to maintain the attitude (S5).

Flight controller 101e adjusts the angles of deflection plates 121 of four regulators 120 in accordance with the determined amount of correction (S6). This process adjusts the angles of the airflows produced by four generators 110.

Subsequently, sound pickup processing unit 101a determines whether a sound recording command has been obtained (S7). When sound pickup processing unit 101a determines that the sound recording command has been obtained (Yes in S7), the operation returns to the process of step S1. When sound pickup processing unit 101a determines that the sound recording command has not been obtained (No in S7), flight controller 101e returns to the process of step S2 to continue the sound recording control.

When the normal control starts, flight controller 101e performs the processes of step S8 through step S11.

Flight controller 101e identifies the current state of unmanned aircraft 100 from the detection results of acceleration sensor 103, gyroscope sensor 104, and altitude sensor (S8).

Flight controller 101e then compares the current state of unmanned aircraft 100 that has been identified with the target value of the state of unmanned aircraft 100 included in the operation signal received from controller 200 to determine an amount of correction required to maintain the state (S9).

Flight controller 101e adjusts the rotational speed of at least one of rotor blades 111 of four generators 110 in accordance with the determined amount of correction (S10). This process individually adjusts, in each of four generators 110, the magnitude of thrust for unmanned aircraft 100 to fly obtained by the airflow produced by each of four generators 110.

Subsequently, sound pickup processing unit 101a determines whether a sound recording command has been obtained (S11). When sound pickup processing unit 101a determines that the sound recording command has been obtained (Yes in S11), the operation returns to the process of step S1. When sound pickup processing unit 101a determines that the sound recording command has not been obtained (No in S11), flight controller 101e returns to the process of step S8 to continue the normal control.

Figure 6:
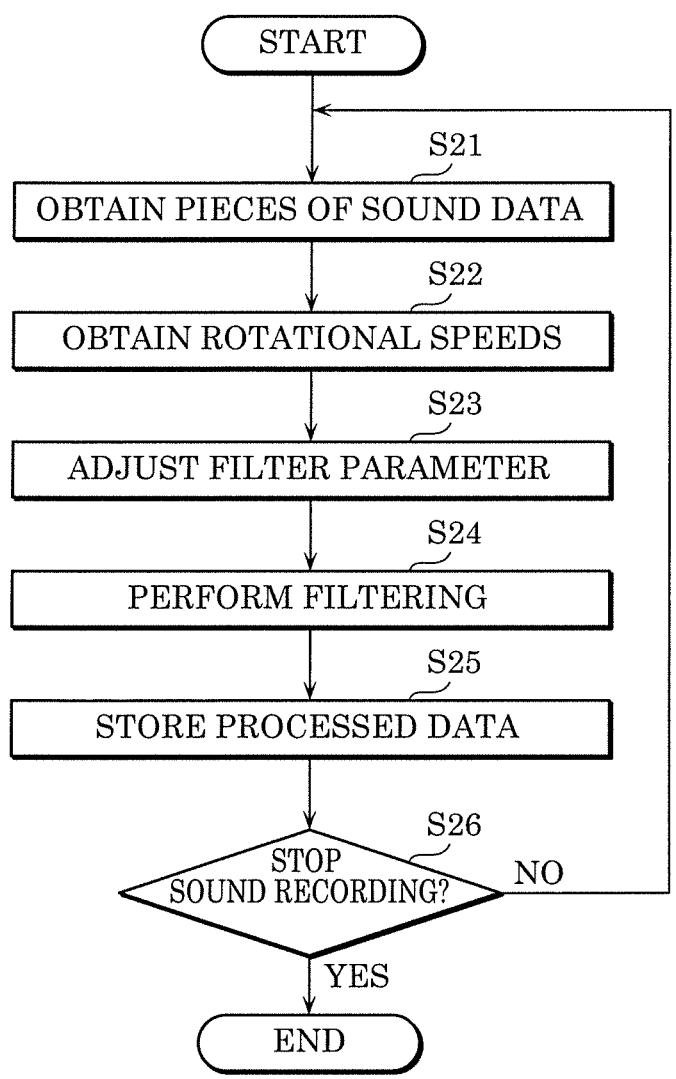
FIG. 6 is a flowchart of an exemplary noise filtering process in the sound recording control performed by the unmanned aircraft according to an embodiment of the present disclosure.

FIG. 6 is a flowchart of an exemplary noise filtering process in the sound recording control performed by the unmanned aircraft according to the embodiment. The noise filtering process starts upon the start of the sound recording control, and ends upon the completion of the sound recording control.

Sound pickup processing unit 101a of unmanned aircraft 100 obtains from four microphones 105 four pieces of sound data generated by four microphones 105 (S21).

Next, noise processing unit 101b obtains the rotational speed of rotor blades 111 of four generators 110 (S22). Stated differently, noise processing unit 101b obtains from flight controller 101e the rotational speed determined in step S3.

Noise processing unit 101b adjusts the filter used for filtering, in accordance with the obtained rotational speed to the filter parameter for filtering the frequency ranges of the noises caused by four rotor blades 111 when rotating in accordance with such obtained rotational speed (S23). For example, the filter may be a band-stop filter, and the filter parameter may be a filtering start frequency, a filtering stop frequency, a degree, etc. Only the basic frequency of noise may be subjected to filtering, or the frequency of multiples of the basic frequency may further be subjected to filtering.

Noise processing unit 101b uses the filter that has undergone the filter parameter adjustment to filter the sound data obtained by sound pickup processing unit 101a (S24).

Noise processing unit 101b stores the filtered sound data (S25). Note that the stored sound data may be transmitted to mobile terminal 300 via communication IF 109.

Sound pickup processing unit 101a determines whether the sound recording is to stop (S26). More specifically, when the obtained sound data includes a sound recording command indicating that the sound recording control is to stop, sound pickup processing unit 101a determines that the sound recording is to stop (Yes in S26), and ends the noise filtering process. When the obtained sound data does not include a sound recording command indicating that the sound recording control is to stop, sound pickup processing unit 101a determines that the sound recording is not to stop (No in S26), and returns to the process of step S21.

3. Effect, etc.

Processor 101 of unmanned aircraft 100 according to the embodiment generates a control request for changing the rotational speed of at least one of rotor blades 111 included in four generators 110 to reduce the difference in the rotational speeds, in response to the start of the sound recording by four microphones 105. Consequently, each of four generators 110 rotates the corresponding rotor blade 111 in accordance with the control request. This configuration is capable of narrowing the frequency ranges of the noises caused by four generators 110. As a result, the self-generated unmanned aircraft noise component of the recorded sound is limited to a narrow frequency range, so the frequency range of the original sound influenced by filtering is minimized. The quality of the target sound is thus enhanced.

Figure 7:
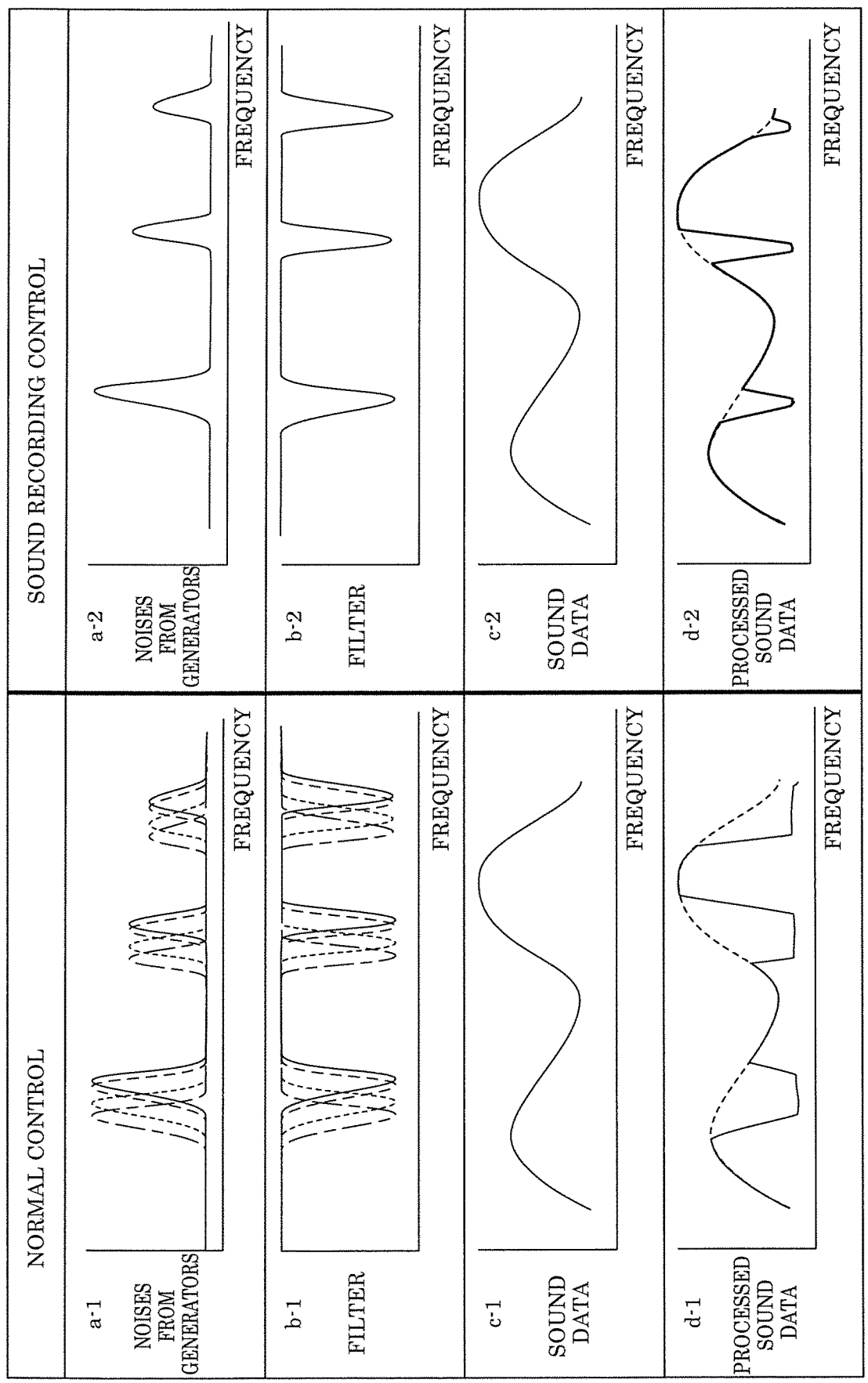
FIG. 7 is a diagram that illustrates the frequency characteristics of the noises, the filters, the sound data, and the filtered sound data obtained in the normal control and the sound recording control.
Figure 8:
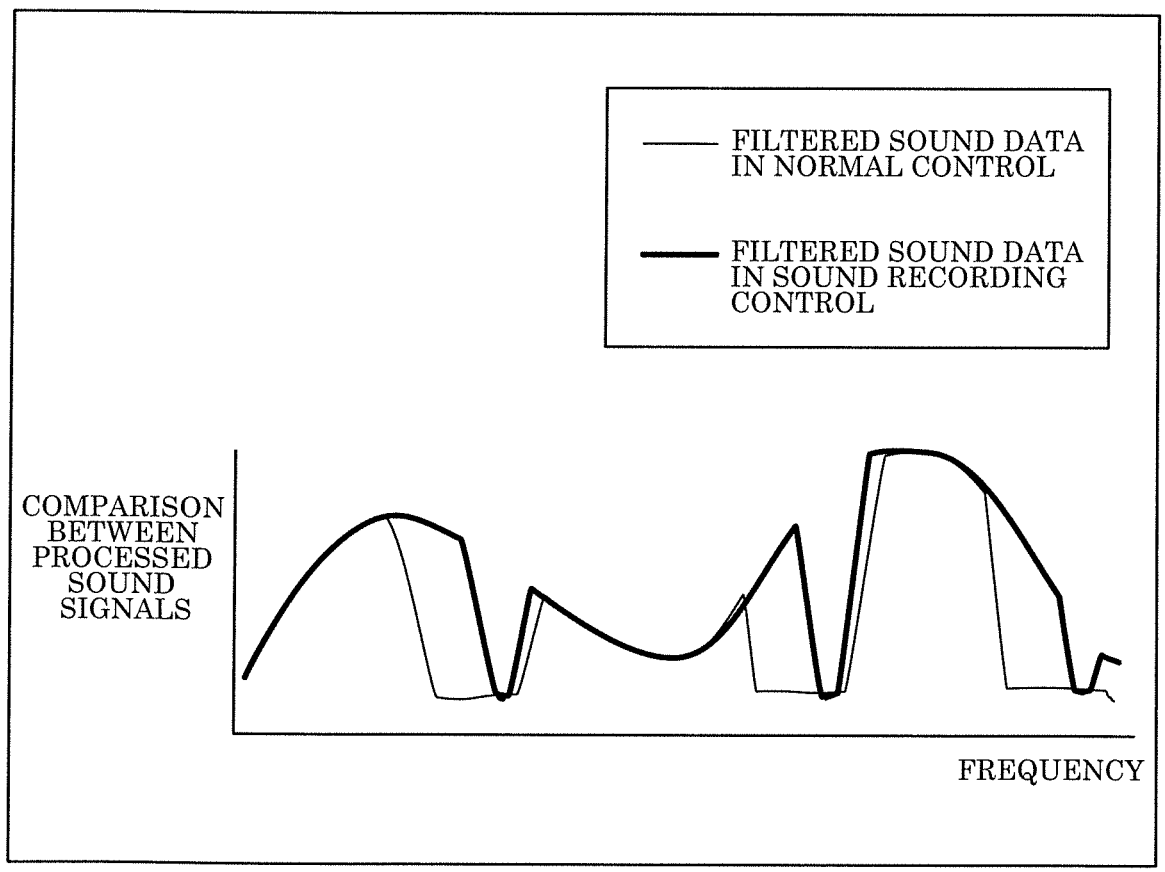
FIG. 8 is a diagram that illustrates pieces of the filtered sound data obtained in the normal control and the sound recording control overlaid upon each other.

The following describes such effect with reference to FIG. 7 and FIG. 8.

FIG. 7 is a diagram that illustrates the frequency characteristics of the noises, the filters, the sound data, and the filtered sound data obtained in the normal control and the sound recording control. a-1, b-1, c-1, and d-1 of FIG. 7 respectively show the frequency characteristics of the noises, the filter, the sound data, and the filtered sound data in the normal control. a-2, b-2, c-2, and d-2 of FIG. 7 respectively show the noises, the filter, the sound data, and the frequency characteristics of the filtered sound data in the sound recording control.

In the normal control, as shown in a-1 of FIG. 7, four generators 110 are controlled with the individual rotational speeds, meaning that four generators 110 are controlled in many cases in accordance with mutually different rotational speeds. For this reason, noises from four generators 110 contain four noises in four different frequency ranges corresponding to four different rotational speeds. Since the noises in these four different frequency ranges need to be filtered by filtering, a filter that reduces the components of these four different frequency ranges is set as shown in b-1 of FIG. 7. When the filtering that uses the filter shown in b-1 of FIG. 7 is performed on the obtained sound data as shown in c-1 of FIG. 7, the resultant is sound data, as shown in d-1 of FIG. 7, from which the sound components of a wide frequency range have been removed.

Meanwhile, in the sound recording control, the rotational speeds of four generators 110 are controlled to have a reduced difference, e.g., to be the identical rotational speed. For this reason, the noises from four generators 110 contain noise in a single frequency range in accordance with the single identical rotational speed as shown in a-2 of FIG. 7. Since the noise in a single frequency range is simply required to be filtered by filtering, a filter that reduces the components of a single frequency range is set as shown in b-2 of FIG. 7. When the filtering that uses the filter shown in b-2 of FIG. 7 is performed on the obtained sound data as shown in c-2 of FIG. 7, the resultant is sound data, as shown in d-2 of FIG. 7, from which the sound components of a narrower frequency range than that of the removed sound components shown in d-1 of FIG. 7 have been removed. Note that the sound data shown in c-1 and the sound data shown in c-2 of FIG. 7 are the same pieces of sound data.

FIG. 8 is a diagram that illustrates the pieces of the filtered sound data obtained in the normal control and the sound recording control overlaid upon each other.

As shown in FIG. 8, the frequency characteristic of the filtered sound data in the sound recording control are represented by a narrow frequency range of the sound components that have been removed by filtering, compared to the frequency characteristic of the filtered sound data in the normal control. This means that sound recording control can increase the SN ratio, and enhance the quality of the target sound.

The SN ratio is calculated, for example, by first determining the sound level in decibels of the microphone signal with only the unmanned aircraft sound prior to noise reduction sound filtering, calculating the sound level of a target sound recorded by the microphone after noise reduction, also in decibels, and then calculating the difference between the two as the SN ratio.

Unmanned aircraft 100 includes microphones 105 that generate sound data. This configuration facilitates the synchronization between the start of sound recording by the microphones and the control of the rotor blades.

Also, processor 101 of unmanned aircraft 100 filters, from the sound data generated by four microphones 105, the portions corresponding to the frequency ranges of the noises caused by the rotations of rotor blades 111. This configuration reduces the noises caused by the rotations of rotor blades 111 of four generators 110 with minimal delay, as compared to using an external device, allowing faster response of the unmanned aircraft in response to a sound.

Furthermore, processor 101 of unmanned aircraft 100 generates a control request for changing the rotational speed of at least one rotor blade 111 of four rotor blades 111 to be identical to at least one other rotor blade 111. This configuration narrows to minimize the frequency range of the noises caused by the rotations of rotor blades 111 of four generators 110, and thus effectively reduces such noises.

Furthermore, processor 101 of unmanned aircraft 100 determines a rotational speed, to which the rotational speed of at least one of rotor blades 111 is changed in response to the control request, for maintaining the altitude, speed, attitude, or other state of unmanned aircraft 100 in flight. This configuration maintains the altitude, speed, or attitude of unmanned aircraft 100 in flight even when the rotational speed of at least one of rotor blades 111 of four generators 110 is changed to reduce the difference in the rotational speeds. This thus enables the target sound to be recorded in a trackable manner.

Unmanned aircraft 100 includes four regulators 120 that regulate the directions of the airflows produced by four generators 110, and acceleration sensor 103 and gyroscope sensor 104 serving as attitude sensors for detecting the attitude of unmanned aircraft 100. Processor 101 causes four regulators 120 to regulate the airflows in the direction in which the attitude of unmanned aircraft 100 is maintained. This configuration narrows to minimize the frequency range of the noises caused by the rotations of rotor blades 111 of four generators 110, and also maintains the attitude of unmanned aircraft 100.

Each of four regulators 120 of unmanned aircraft 100 includes deflection plate 121 that is located at the downstream side of an airflow produced by the corresponding one of four generators 110. This configuration deflects the airflows produced by rotor blades 111 of four generators 110, generating a moment force around the center of gravity of the unmanned aircraft, even when the difference in the rotational speeds of rotor blades 111 of four generators 110 is small. Adjusting the angle of the deflection plate allows the size of the moment force to be controlled, therefore controlling the rotation of the vehicle around its center of gravity, and thus effectively maintains the attitude of unmanned aircraft 100.

4. Variation 4-1. Variation 1

Unmanned aircraft 100 according to the above-described embodiment includes four generators 110, but the number of generators included in unmanned aircraft 100 is not limited to four, and thus may be one to three, or five or more.

4-2. Variation 2

Unmanned aircraft 100 according to the above-described embodiment includes four ducts 130 and main body 140 that are connected by four arms 141 as a non-limited example, and thus four ducts 130 or four arms 141 may not be included so long as four generators 140 are connected to main body 140. Stated differently, in the unmanned aircraft, main body 140 may be directly connected to four generators 110, or may be directly connected to four ducts 140. Also, the unmanned aircraft may not include four ducts 130, or more specifically, the lateral sides of four generators 110 may not be covered. Alternatively, four ducts 130 may be directly connected to main body 140.

4-3. Variation 3

Unmanned aircraft 100 according to the above-described embodiment includes four microphones 105, but the number of microphones included in unmanned aircraft 100 is not limited to four, and thus may be one to three, or five or more. When unmanned aircraft 100 includes a small number of microphones 105, the sound source direction may be estimated by rotating the attitude of unmanned aircraft 100 to obtain plural pieces of sound data at different timings and compare such pieces of sound data. Microphones 105 are simply required to be arranged on the outer side of unmanned aircraft 100, or more specifically, exposed to an exterior space, and thus may be arranged on a side of arms 141 other than on a side of main body 140. Alternatively, microphones 105 may be arranged away from main body 140. For example, microphones 105 may be arranged at ends or in the middle of stick-like arms, lines like metallic wires, or ropes like threads that are provided to main body 140 in addition to arms 141 and that extend in a direction away from main body 140.

4.4. Variation 4

Unmanned aircraft 100 according to the above-described embodiment includes a single regulator 120 for each of four ducts 130, but may include two regulators for each of four ducts 130. When the unmanned aircraft includes two regulators for each of four ducts 130, an additional regulator is provided that is arranged in an attitude in which its axis of rotations is substantially orthogonal to deflection plate 121 of the corresponding regulator 120.

4.5. Variation 5

In unmanned aircraft 100 according to the above-described embodiment, each of four regulators 120 changes the orientation of deflection plate 121 to deflect an airflow produced by the corresponding generator 110, but the present disclosure is not limited to this example. The four regulators thus may deflect the airflows produced by four generators 110, for example, with four ducts 130 rotating about main body 140 at the four connection portions at which four ducts 130 are connected to four arms 141, with four arms 141 serving as the axes of rotations.

4.6. Variation 6

Unmanned aircraft 100 according to the above-described embodiment includes four microphones 105, but may not include microphones 105. The unmanned aircraft without any microphones may change the rotational speed of at least one of the rotor blades of four generators 110 to reduce the difference in the rotational speeds, in response to the start of sound recording by an external microphone. This configuration, which changes the rotational speed of at least one rotor blade 111 of four generators 110 to reduce the difference in the rotational speeds in response to the external microphone, reduces the influence of the noises caused by four generators 110 on the external microphone. Note the noise included in the sound picked up by the external microphone may be filtered at the time of the sound recording, or may be additionally filtered after the sound recording. When the noise is filtered after the sound recording, the filter parameter used at the time of changing the rotational speeds is stored, and filtering may be performed in a follow-up manner by use of such stored filter parameter.

4.7. Variation 7

Unmanned aircraft 100 according to the above-described embodiment starts sound recording when the sound data obtained by sound pickup processing unit 101a includes a sound recording command indicating that sound recording is to start, but the present disclosure is not limited to this example. Unmanned aircraft 100 may thus start sound recording, for example, when: the sound data obtained by sound pickup processing unit 101a includes a sound recording command indicating that sound recording is to start; when a user's gesture indicating that sound recording should start has been recognized from the analysis of the image data obtained by camera 107; or when a user's lip movement to utter words, such as a keyword, indicating that sound recording should start has been recognized.

Also, unmanned aircraft 100 may autonomously fly in accordance with a previously set program without being operated by controller 200.

Controller 200 operates unmanned aircraft 100 in accordance with a previously set program without having an interface for operating unmanned aircraft 100.

4.8. Variation 8

Unmanned aircraft 100 according to the above-described embodiment generates a control request for changing the rotational speed of at least one rotor blade 111 of four generators 110 to reduce the difference in the rotational speeds in response to the start of sound recording by the microphones, but such control request may be generated by an external information processing device that communicates with unmanned aircraft 100. In this case, the external information processing device transmits the generated control request to unmanned aircraft 100.

Moreover, in the above embodiment and variations, the structural components may be implemented as dedicated hardware or may be implemented by executing a software program suited to such structural components. Alternatively, the structural components may be implemented by a program executor such as a CPU and a processor reading out and executing the software program recorded in a recording medium such as a hard disk and a semiconductor memory. Here, the software program that enables unmanned aircraft 100 and the information processing method, etc. according to the embodiment is as described below.

Stated differently, such program causes a computer to execute an information processing method performed by an information processing device that communicates with an unmanned aircraft, the unmanned aircraft including a processor, and at least two generators that generate thrust for the unmanned aircraft to fly, the at least two generators each including a corresponding one of rotor blades that produce airflows. Such information processing method includes: generating a control request for changing a rotational speed of at least one of the rotor blades of the at least two generators to reduce a difference between rotational speeds, in response to start of sound recording by a microphone; and transmitting the control request generated in the generating to the unmanned aircraft.

The unmanned aircraft, the information processing method, and the recording medium according to one or more aspects of the present disclosure have been described on the basis of the embodiment, but the present disclosure is not limited to the such embodiment. The range of one or more aspects of the present disclosure may include variations achieved by making various modifications and alternations to the present disclosure that can be conceived by those skilled in the art without departing from the essence of the present disclosure, and an embodiment achieved by any combination of structural components described in the present specification.

Note that machine learning may be utilized for processes performed by obstacle detector 101g and flight controller 101e, and for image recognition processing and sound recognition processing. Examples of machine learning include: supervised learning in which an input-output relationship is studied by use of teaching data, which is input information labeled with output information; unsupervised learning in which data structure is built up only from an unlabeled input; semi-supervised learning in which both labeled and unlabeled data are utilized; and reinforcement learning in which feedback (reward) is obtained to an action selected from the result of state observation to study successive actions that enable the obtainment the maximum amount of reward. More specific techniques of machine learning include neural-network learning (including deep learning that utilizes multi-layered neural network), genetic programming, decision tree learning, Bayesian network learning, and support vector machine (SVM) learning. The present disclosure uses one of these example techniques.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is applicable for use as an unmanned aircraft, an information processing method, a recording medium, etc. capable of enhancing the quality of the target sound.

What is claimed is:

1. An unmanned aircraft, comprising:
   a processor; and
   at least two generators that generate thrust for the unmanned aircraft to fly, the at least two generators each including a corresponding one of rotor blades that produce airflows,
   wherein during sound recording by a microphone, the processor controls a rotational speed of at least one of the rotor blades of the at least two generators so that a difference between rotational speeds of the rotor blades becomes less than before a start of the sound recording by the microphone, and
   the at least two generators rotate the rotor blades in accordance with the control request.

2. The unmanned aircraft according to claim 1, further comprising:
the microphone that generates sound data.

3. The unmanned aircraft according to claim 2, wherein the processor further filters, from the sound data generated by the microphone, a portion corresponding to a frequency range of noise caused by rotation of each of the rotor blades.

4. The unmanned aircraft according to claim 1, wherein the processor generates the control request for changing the rotational speed of at least one of the rotor blades to be identical to at least another one of the rotor blades.

5. The unmanned aircraft according to claim 1, wherein the processor determines a rotational speed, to which the rotational speed of at least one of the rotor blades is changed in response to the control request, for maintaining an altitude, speed, or attitude of the unmanned aircraft in flight.

6. The unmanned aircraft according to claim 1, further comprising:
a regulator that regulates a direction of each of the airflows produced by the at least two generators; and
an attitude sensor that detects an attitude of the unmanned aircraft,
wherein the processor causes the regulator to regulate each of the airflows in a direction in which the attitude of the unmanned aircraft is maintained.

7. The unmanned aircraft according to claim 6, wherein the regulator is a deflection plate that is located at a downstream side of the airflows produced by the at least two generators.

8. An information processing method performed by an information processing device that communicates with an unmanned aircraft, the unmanned aircraft including a processor, and at least two generators that generate thrust for the unmanned aircraft to fly, the at least two generators each including a corresponding one of rotor blades that produce airflows, the information processing method comprising:
generating, during sound recording by a microphone, an instruction to control a rotational speed of at least one of the rotor blades of the at least two generators so that a difference between rotational speeds of the rotor blades becomes less than before a start of the sound recording by the microphone; and
transmitting the instruction to the unmanned aircraft.

9. A non-transitory computer-readable recording medium for use in an information processing device that communicates with an unmanned aircraft, the unmanned aircraft including a processor, and at least two generators that generate thrust for the unmanned aircraft to fly, the at least two generators each including a corresponding one of rotor blades that produce airflows, the recording medium having a computer program recorded thereon for causing the information processing device to execute an information processing method including:
generating, during sound recording by a microphone, an instruction to control a rotational speed of at least one of the rotor blades of the at least two generators so that a difference between rotational speeds of the rotor blades becomes less than before a start of the sound recording by the microphone; and
transmitting the instruction to the unmanned aircraft.

* * * * *